United States Patent [19]
Bremer et al.

[11] Patent Number: 5,475,713
[45] Date of Patent: Dec. 12, 1995

[54] SHAPED SIGNAL SPACES IN A SIMULTANEOUS VOICE AND DATA SYSTEM

[75] Inventors: Gordon Bremer; Kenneth D. Ko, both of Clearwater; Luke J. Smithwick, New Port Richey, all of Fla.

[73] Assignee: AT&T Corp., Murray, N.J.

[21] Appl. No.: 76,530

[22] Filed: Jun. 14, 1993

[51] Int. Cl.$^6$ .............................. H04L 5/12; H04L 27/04
[52] U.S. Cl. .......................................... 375/261; 375/259
[58] Field of Search ................................ 375/37, 38, 39, 375/59

[56] References Cited

U.S. PATENT DOCUMENTS

| | | | |
|---|---|---|---|
| 4,512,013 | 4/1985 | Nash et al. | 370/69.1 |
| 4,546,212 | 10/1985 | Crowder | 179/2 C |
| 4,672,602 | 6/1987 | Hargrave et al. | 370/58 |
| 4,757,495 | 7/1988 | Decker et al. | 370/76 |
| 4,891,806 | 1/1990 | Farias | 370/110.1 |
| 4,924,516 | 5/1990 | Bremer et al. | 380/46 |
| 4,937,844 | 6/1990 | Kao | 375/122 |
| 5,022,053 | 6/1991 | Chung | 375/39 |
| 5,081,647 | 1/1992 | Bremer | 375/5 |
| 5,103,227 | 4/1992 | Betts | 341/61 |
| 5,185,763 | 2/1993 | Krishnan | 375/39 |
| 5,237,292 | 8/1993 | Chethik | 332/103 |

OTHER PUBLICATIONS

"Adaptive Equalization and Phase Tracking for Simultaneous Analog/Digital Data Transmission" by T. L. Lim and M. S. Mueller, The Bell System Technical Journal, vol. 60, No. 9, Nov. 1981, pp. 2039–2063, U.S.A.

"High–Speed Digital and Analog Parallel Transmission Technique Over Single Telephone Channel" by Fumio Akashi, Yoichi Sato and Mikiro Eguchi, IEEE Transactions On Communications, vol. Com. 30, No. 5, May 1982, pp. 1213–1218.

"Simultaneous Transmission of Speech and Data Using Code–Breaking Techniques", by R. Steele and D. Vitello, The Bell System Technical Journal, vol. 60, No. 9, pp. 2081–2105, Nov. 1981, USA.

"Adaptive Noise Cancelling: Principles and Applications" by Bernard Widrow, John R. Glover, Jr., John M. McCool, John Kaunitz, Charles S. Williams, Robert H. Hearn, James R. Zeidler, Eugene Dong, Jr., and Robert C. Goodlin, Proceedings of the IEEE, vol. 63, No. 12, Dec.

"An Integrated Digital Subscribers Speech and Data Service" by L. J. Stagg and D. Clothier, GEC Hirst Research Centre, Wembley, Middlesex, England and GEC Telecommunications Ltd., Coventry, England, pp. 39.6.1–39.6.6, London.

"Frequency Domain Data Transmission Using Reduced Computational Complexity Algorithms", by Abraham Peled and Antonio Ruiz, Computer Sciences, Department, IBM T. J. Watson Research Center, IEE 1980, pp. 964–967, USA.

"Speech–band data modems" by P. F. Adams, IEE, 1980, pp. 733–736. USA.

"Speech and Data Transmission In ACS Telephone Channels" by V. E. Bukhviner, Telecommunication & Radio Eng., vol. 30/31, Jul. 1976.

"Method for Superimposing Data On Amplitude–Modulated Signals" Electronics Letters, 29 Apr. 1982, vol. 18, No. 9, pp. 379–381, USA.

"A New Generation of Speech Plus Data Multiplexer", by M. N. Y. Shum, N. A. Samuel and C. Laval, Computer and Systems Engineering Limited (Case), pp. 111–112, London.

*Primary Examiner*—Sandra L. O'Shea
*Assistant Examiner*—John Ning
*Attorney, Agent, or Firm*—Joseph J. Opalach

[57] ABSTRACT

In a simultaneous voice and data communications system, a voice signal is mapped into an N-dimensional signal space constellation as a vector, and added to a reference signal point, i.e., a data symbol, where the data symbol is selected from a constellation of data symbols every signaling interval as a function of a data signal. The constellation signal space is further divided into a number of shaped regions, where each region is associated with a different one of the data symbols. The shape of each region is selected as a function of the characteristics of the voice, or audio, signal. In particular, each region illustratively has a rectangular shape.

14 Claims, 5 Drawing Sheets

SHAPED SIGNAL SPACES IN A SIMULTANEOUS VOICE AND DATA SYSTEM

BACKGROUND OF THE INVENTION

The present invention relates to data communications equipment, e.g., modems. In particular, this invention relates to the transmission of both voice and data signals over the same communications facility at the same time.

The co-pending, commonly assigned, U.S. Patent application of Gordon Bremer and Kenneth D. Ko entitled "Simultaneous Analog and Digital Communication," Ser. No. 08/076,505, filed on Jun. 14, 1993, discloses a simultaneous voice and data communication system in which a voice signal is added to a data signal for transmission over a communications channel to a receiving modem. In particular, the data signal to be transmitted is represented by a sequence of data symbols, where each data symbol is associated with a particular N-dimensional signal point value take from a signal space. Similarly, the voice signal is processed so that it is mapped into the N-dimensional signal space to provide a voice signal point. This voice signal point defines the magnitude and angle of a voice signal vector about the origin of the signal point constellation. The data symbol and the voice signal vector are then added together to select a resultant N-dimensional signal point.

Since this resultant N-dimensional signal point is a function of both the particular data symbol and the magnitude and phase of the voice signal vector, the signal space is essentially divided into a number of square non-overlapping regions, each region comprising a number of signal point values with one signal point value being associated with a data symbol. Consequently, any signal point value within a square region may be validly selected for transmission to a receiving modem. Since each signal point region is non-overlapping, the size of each region is fixed. This results in limiting the magnitude, or dynamic range, of the voice signal vector so that the resultant signal point always lies within a region. The dynamic range of the voice signal vector is directly related to the transmission quality of the voice signal.

Typically the overall size of the signal space is constrained by power limitations. As a result, the modem's data rate and quality of voice transmission are interrelated. For example, for higher voice quality, the signal space is divided into a smaller number of larger size square regions. Each square region is associated with a data symbol and the data rate is directly proportional to the number of data symbols available for transmission. Since there are fewer, but larger, square regions, the dynamic range of the voice signal, and therefore its quality of transmission, increases at the expense of a lower data rate, which is the result of fewer available data symbols. However for lower voice quality, the signal space is divided into a larger number of smaller size square regions. Now since there are more, but smaller, square regions, the dynamic range of the voice signal, and therefore its quality of transmission, decreases with the benefit of a higher data rate. Consequently, any attempt to increase the data rate results in a deterioration in the quality of voice transmission.

SUMMARY OF THE INVENTION

In accordance with the invention, we have realized that the shape, or dimensions, of the signal point regions disclosed in the above-mentioned patent application do not have to be square but can be chosen in accordance with the characteristics and processing of the voice signal, or any auxiliary signal, which is simultaneously transmitted with the data signal. As a result, the shape of each region is chosen in such a way as to maximize the number of available data symbols while at the same time maintaining a given level of voice quality. Therefore, the quality of the voice signal is maintained, yet a higher data rate is achieved.

In an embodiment of the invention, a simultaneous voice and data communications system partitions the signal space of a constellation into a number of different regions. The shape of each region is selected as a function of the characteristics of the voice signal. In particular, each region illustratively has a rectangular shape, which provides a better match to the characteristics of the voice signal. By using rectangular shaped regions a higher data rate can be supported for a given level of voice quality since a constellation of signal points can be divided into more regions (and hence support a higher data rate) while still maintaining a given level of quality in the voice transmission. For example, since each region is rectangular, the allowable magnitude of the voice signal is maintained in at least one dimension, while decreasing the magnitude in the other dimension. This allows additional data symbols to be packed into the signal space without changing the dynamic range of the voice signal and concomitantly, maintains the overall quality of the voice transmission at a higher data rate.

DETAILED DESCRIPTION

Figure 1:
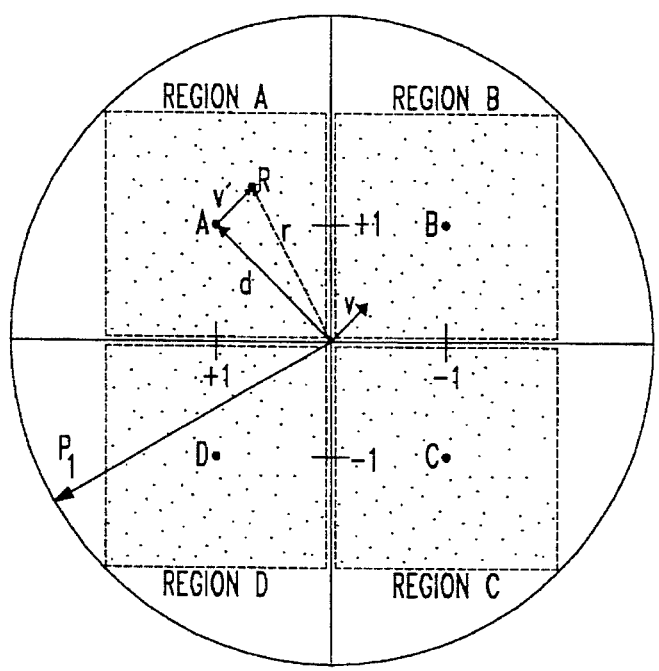
FIG. 1 shows an illustrative non-overlapping signal point constellation for use in a simultaneous voice and data communications system.

The above-mentioned co-pending patent application of Gordon Bremer and Kenneth D. Ko, which is hereby incorporated by reference, discloses a transmitter in which the transmitted signal represents a sequence of N-dimensional signal points, where each signal point is a function of at least two separate signals. Illustratively, one of these signals is an analog, or voice signal, and the other signal is a data signal. An illustrative 4-QAM symbol constellation for use in the simultaneous voice and data system disclosed in the above-mentioned co-pending patent application is shown in FIG. 1. As described in this co-pending patent application, a data signal is first encoded in each signaling interval, T, to select one of four non-overlapping regions, each region represented by one of the reference symbols "A," "B," "C," and "D." For example, the symbol "A" represents region 1, and in particular is associated with the signal point represented by the signal space coordinates (−1, +1), which represents the "in-phase" and "quadrature" components as is known in the art. In a prior art data-only communications system, a transmitter only transmits one of the four symbols selected from this symbol constellation. In other words, there are only four valid signal point coordinates that can be transmitted. However, as disclosed in the co-pending application of Gordon Bremer and Kenneth D. Ko, another signal, e.g., a voice signal, is added to the selected data symbol, with the result that any signal point within a chosen region is selected for transmission. Therefore, each valid region comprises a continuous range of possibly valid signal points and each region is associated with a different data symbol. For example, in every signaling interval, T, the voice signal is processed in such a way to provide two samples of the voice signal. These two samples are used to create a "voice signal vector" in the constellation signal space, e.g., the voice signal vector v shown in FIG. 1. In other words, the two samples of the voice signal, every signaling interval, select a signal point, i.e., a "voice signal point," about the origin of the signal space. The coordinates of this voice signal point define the magnitude and angle of the voice signal vector v from the origin of the signal space. This voice signal vector is than added, i.e., by vector addition, to a data vector, d, which represents the selected data symbol in each signaling interval, T. The resultant vector, r, selects a particular signal point, R, for transmission from the selected region. As can be observed from FIG. 1, the magnitude of the voice signal vector v is constrained so that the resulting signal point, R, lies within a region.

From FIG. 1 it can be seen that each region has a square shape and is centered about the signal point that is associated with each data symbol. Consequently, the magnitude of any voice signal vector is limited in size to one half of the width of each region. Unfortunately, voice signals have a much larger dynamic amplitude range and have an amplitude probability distribution heavily weighted toward zero, i.e., voice is mostly very small in amplitude with only occasional bursts to near full scale. Consequently, any constraint on the magnitude of the voice signal vector directly affects the allowable dynamic range of the voice signal and thereby limits the quality of transmission of the voice signal. For example, it can be observed from FIG. 1 that only four square regions fit within the circle defined by the radius $P_1$. This circle represents power limitations, which in reality, are imposed on the size of the signal space. Therefore, in order to pack in more data symbols to increase the data rate, the size of each square region must be reduced, which as mentioned above degrades the quality of voice transmission.

Figure 2:
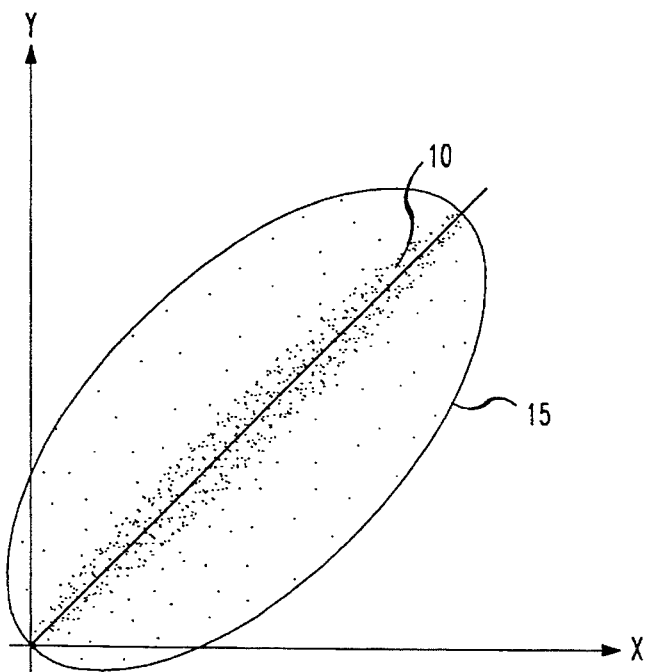
FIG. 2 shows a graph that generally illustrates the characteristics of a two-dimensional voice signal vector over a period of time.
Figure 3:
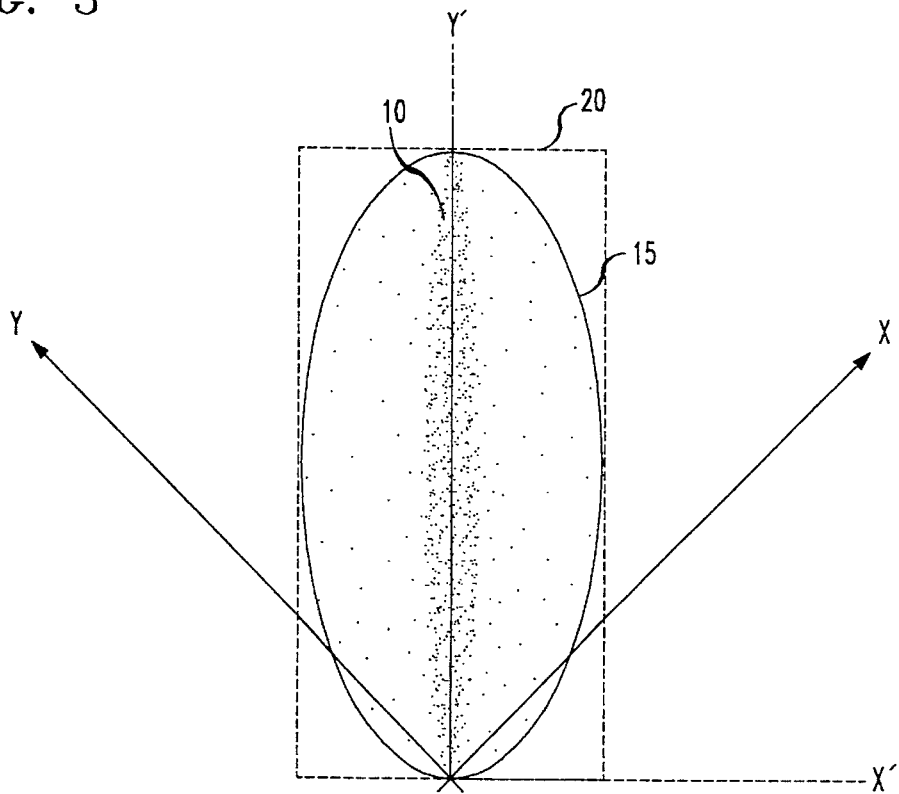
FIG. 3 shows the graph of FIG. 2 rotated by 45 degrees.

As disclosed in the above-mentioned co-pending patent application, the voice vector, v, is formed by sampling a voice signal at twice the symbol rate, 1/T. The voice samples are grouped into pairs which form the coordinates of the voice signal point, which thereby defines the voice signal vector, v. Any voice signal can be viewed as comprising both "voiced" and "unvoiced" components. Generally speaking, the voiced components represent highly correlated speech signals, while the unvoiced components represent uncorrelated speech signals that may include background noise. During sampling of the voiced components of the voice signal, each sample is correlated to the next sample. In other words, consecutive samples will not vary in magnitude to a great degree. However, sampling of the unvoiced components will result in more random distribution of voice sample values, therefore consecutive samples will tend to vary in magnitude. This is illustrated in FIG. 2, which generally plots the values of the sample pairs, which form the coordinates of the voice signal point. Since the voice components are correlated, each sample of a sample pair during a voiced interval is generally equal to the other, with the result that the resultant voice signal vector changes in magnitude along line 10 shown in FIG. 2. However, during an unvoiced interval, each sample of a sample pair may be different with the result that there is a deviation from line 10 as shown by area 15 of FIG. 2. Alternatively, this is shown in FIG. 3, where both line 10 and area 15 are rotated by 45 degrees. As can be seen from FIG. 3, the characteristics of a voice signal vector, and the underlying voice signal, are such that the dynamic range requirements in each dimension are different. Indeed, the shape that the voice signal vector, v, traces over a period of time fits within rectangle 20 of FIG. 3 since the more correlated samples are mapped to a longer axis and the less correlated samples are mapped to a shorter axis. Although the above description is in the context of a voice signal, it should be noted that the "sample pairs" of any analog signal, when sampled at a high enough rate, will be highly correlated.

Therefore, and in accordance with the invention, the dimensions of each region of signal space are chosen as a function of the characteristics of the voice signal vector, which in turn is a function of both the voice signal and the method of processing the voice signal. In this example, the resultant shape of each region is a rectangle, which provides a better match to the characteristics of the voice signal samples than the square regions disclosed in the co-pending patent application of Gordon Bremer and Kenneth D. Ko. As a result, a higher data rate can be supported for a given level of voice quality since a constellation of signal points can be divided into more regions (and hence support a higher data rate) while still maintaining a given level of quality in the voice transmission. In other words, by using regions having a rectangular shape, the quality of the voice signal is maintained or increased for a given data rate.

Figure 4:
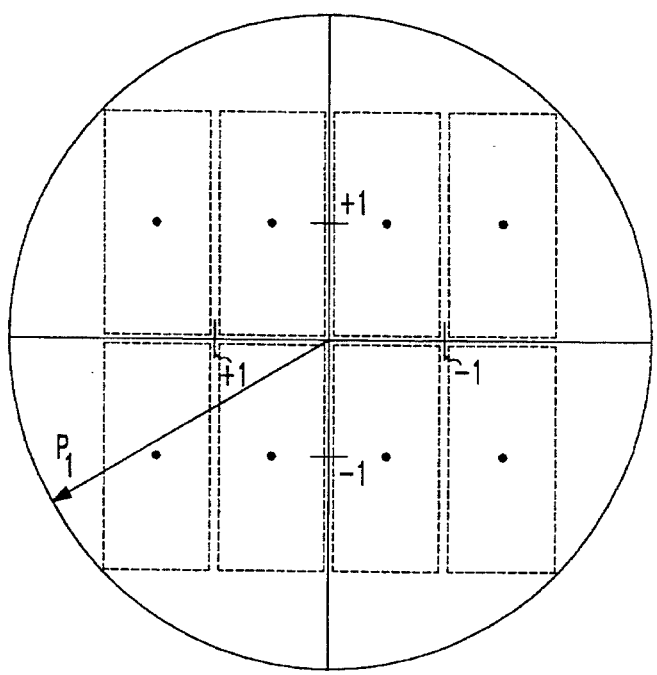
FIG. 4 illustrates a signal point constellation used in the transmitter of FIG. 5.

In particular, FIG. 4 shows an illustrative signal point constellation in which each of the regions are rectangular. Compared to FIG. 1, each region of FIG. 4 has one half of the width along the real axis while maintaining the same width along the imaginary axis. As can be seen from FIG. 4, the number of data symbols has been increased from four (shown in FIG. 1) to eight in FIG. 4. In other words, more data symbols are packed into the circle defined by the radius $P_1$, yet the voice signal's allowable dynamic range, which is mapped into the imaginary direction is the same. As a result, a higher data rate is provided with a higher quality of voice transmission then was heretofore available.

Figure 5:
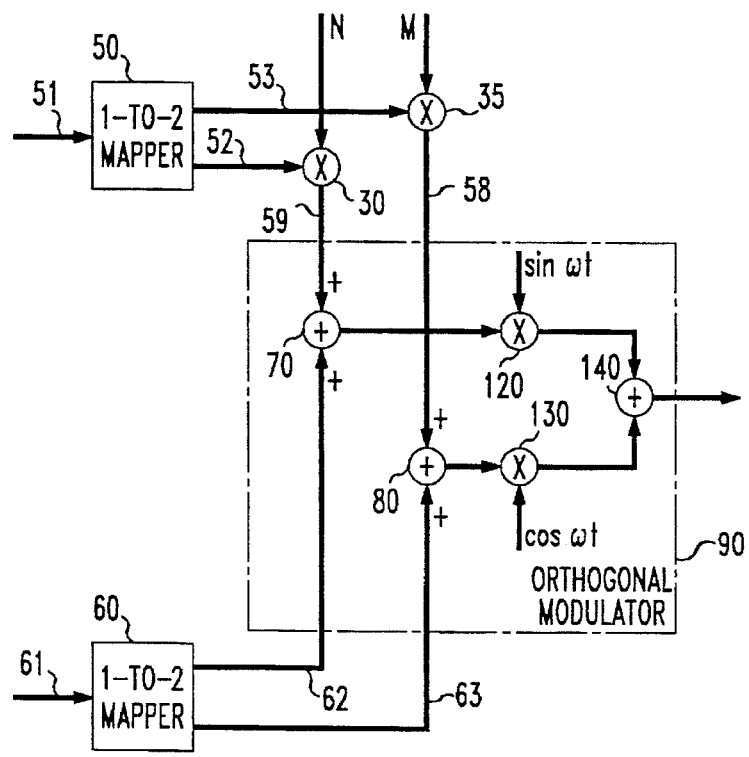
FIG. 5 shows a block diagram of a transmitter embodying the principles of the invention.

FIG. 5 depicts an arrangement that very basically illustrates the principles of this invention. A voice signal is applied to 1-to-2 mapper 50 via line 51. Mapper 50 samples the voice signal at twice the symbol rate 1/T every signaling interval T, and develops two signals on lines 52 and 53, which are applied to elements 30 and 35 respectively. These two signals represent the coordinates of a voice signal point as shown in FIG. 3. Mapper 50 not only samples the voice signal, but also rotates the samples by 45 degrees, i.e., mapper 50 changes the way the voice signal is mapped into the signal space. In accordance with the invention, elements 30 and 35 scale the output of mapper 50 in such a way that the resultant signal point from the vector addition of the voice vector and the data vector (discussed below) lies within the selected rectangular region. For the purposes of this example, M, which represents the real axis, is equal to N/2. In other words, elements 30 and 35 bound the voice vector to the selected region.

In each signalling interval T, encoded digital signals are applied to 1-to-2 dimensional mapper 60, which develops two output pulses on lines 62 and 63, each of which possesses an amplitude that relates to the encoded digital signals arriving on line 61. These two output pulses represent the coordinates in the signal space of one of the data symbols from FIG. 4. Outputs 59 and 62 are combined in adder 70 and outputs 58 and 63 are combined in adder 80. The outputs of adders 70 and 80 form the components of the signals, i.e., the resultant signal point for transmission selected from the signal space of FIG. 4. The outputs of adders 70 and 80 are applied to modulators 120 and 130 and summed in adder 140 to form a modulated signal as is typically known in the art. Although not shown for simplicity, it should be noted that the outputs of adders 70 and 80 can be additionally processed by filters that are bandlimited to no more than $\omega$, in order to avoid aliasing, and to at least half the inverse of the output sample rate of mapper 60.

In FIG. 5 element 60 is depicted as a 1-to-2 mapper. However, it should be understood that this elements can be an M-to-N mapper. That is, element 60 can be responsive to a plurality (M) of encoded digital signals and it can develop a different plurality (N) of output signals. Similarly, element 50 can be an M-to-K encoder that is responsive to a plurality of analog signals. Likewise, the collection of elements that follow elements 50 and 60 (i.e., elements 70, 80, 120, 130 and 140), which form orthogonal modulator 90 can be constructed to be responsive to the plurality of outputs of elements 50 and 60. More specifically, those elements must account for all of the applied input signals, and that means that they must be able to handle K or N signals, whichever is larger. In such a circumstance, however, the user can assume that the larger of the two (K or N) is the dimensionality of the system, and some of the dimensions have either no digital data, or no analog data, whichever applies. Of course, if there are "dimensions" for which there is no digital or analog data, other information can be sent over those dimensions, such as equalization "side" information.

In the context of a signal space, the N pluralities of output signals of elements 50 and 60 (assuming N is larger than K) correspond to the collection of components of vectors in multi-dimensional space; e.g., N-dimensional space. The coordinates of this multi-dimensional space correspond to the orthogonal modulation signals within orthogonal modulator 90. In FIG. 5, the two orthogonal modulation signals are cos $\omega$t and sin $\omega$t, but other modulation signals are also possible. For example, code division multiplexing (CDMA) templates. For purposes of this invention, orthogonal modulation signals are modulation signals that develop a transmitted signal comprising concurrent element signals and yet allow the receiver to separate the received signal into its constituent element signals, those being the signals developed in response to each of the modulation signals. It may also be observed that, relative to FIG. 1 as discussed above, orthogonal modulator 90 performs vector summation of the symbol vector represented by the components developed by element 60 with the analog information vector represented by the components developed by element 50.

Figure 6:
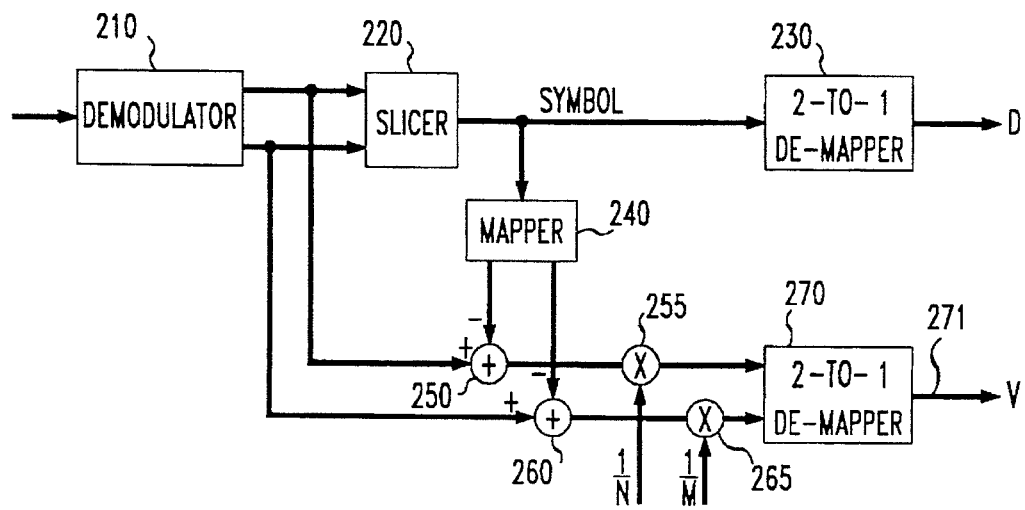
FIG. 6 shows a block diagram of a receiver, which receives the transmitted signal from the transmitter of FIG. 5.

FIG. 6 presents a basic block diagram of a receiver in conformance with the principles of this invention. The modulated input signal received from the channel is applied to demodulator 210 which develops the in-phase and quadrature components. Those are applied to slicer 220 which identifies the symbols, i.e., maps the received signal point to the closest data symbol from the constellation of FIG. 4. Slicer 220 provides the identified symbols to de-mapper 230, which performs the inverse function to mapper 60 discussed above. In addition, FIG. 6 includes 1-to-2 mapper 240 that is responsive to the symbols developed by channel slicer 220. The output of mapper 240 is the set of in-phase and quadrature components (that are applied in the FIG. 5 arrangement to elements 70 and 80). The outputs of mapper 240 are subtracted from the outputs of demodulator 210 in subtracters 250 and 260. The outputs of subtracters 250 and 260 are applied to elements 255 and 265, respectively. The latter performs the inverse scaling function of elements 30 and 35 discussed above. The output's of elements 255 and 265 are applied to 2-to-1 de-mapper 270 which performs the inverse function of mapper 50 and recombines the voice samples to form the voice signal on line 271.

Figure 7:
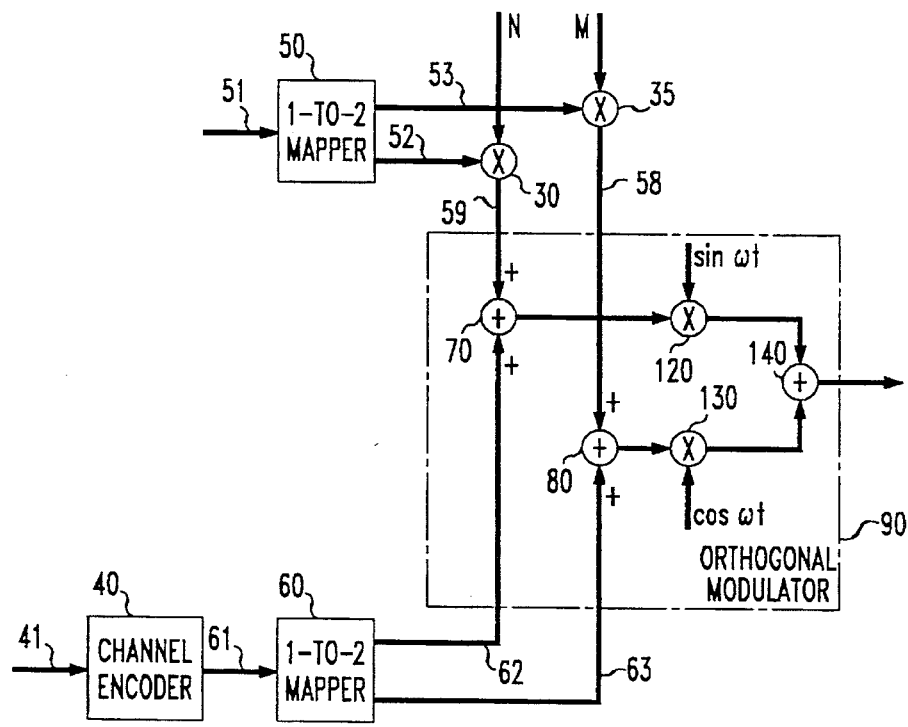
FIG. 7 shows a block diagram of another transmitter embodying the principles of the invention.
Figure 8:
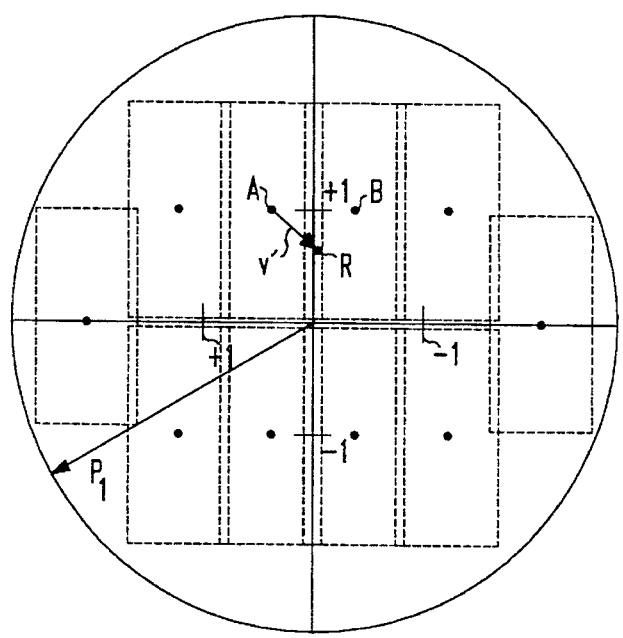
FIG. 8 illustrates a signal point constellation used in the transmitter of FIG. 7.

Another transmitter embodying the principles of the invention is shown in FIG. 7 and illustratively uses the signal point constellation shown in FIG. 8. The transmitter of FIG. 7 is similar to the transmitter of FIG. 5 except for the addition of channel encoder 40, which is responsive to digital signals applied on line 41. Channel encoder 40 operates in accordance with known encoding techniques and is illustratively a trellis encoder like that specified in the CCITT V.32 standard, or shown in other prior art, e.g., U.S. Pat. No. 4,941,154 issued Jul. 10, 1990 to L.-F. Wei. A trellis encoder is a form of convolutional code. In each signalling interval T, channel encoder 40 provides a trellis encoded digital signal to 1-to-2 dimensional mapper 60, which maps the trellis encoded digital signal into the signal space constellation shown in FIG. 8. The remainder of the transmitter functions as described above for the transmitter of FIG. 3.

As disclosed in the co-pending U.S. Patent application of William L. Betts, Gordon Bremer and Edward S. Zuranski, Ser. No. 08/076,507, filed on Jun. 14, 1993 channel encoding the data signal, in a simultaneous voice and data communication system, allows the regions of the signal space to overlap notwithstanding the fact that occasionally "hard errors" are introduced at the receiver. Consequently, for a given region shape, even more dense packing of the data symbols can be achieved. This is illustrated by the signal space shown in FIG. 8. This signal space is similar to the signal space of FIG. 4 except that each region now overlaps with each adjacent region. As can be seen from FIG. 8, the number of data symbols packed into the signal space defined by the circle of radius $P_1$ is more than the number of data symbols packed in the signal space shown in FIG. 4, yet the quality of the voice signal is the same even though a higher data rate is achieved.

Figure 9:
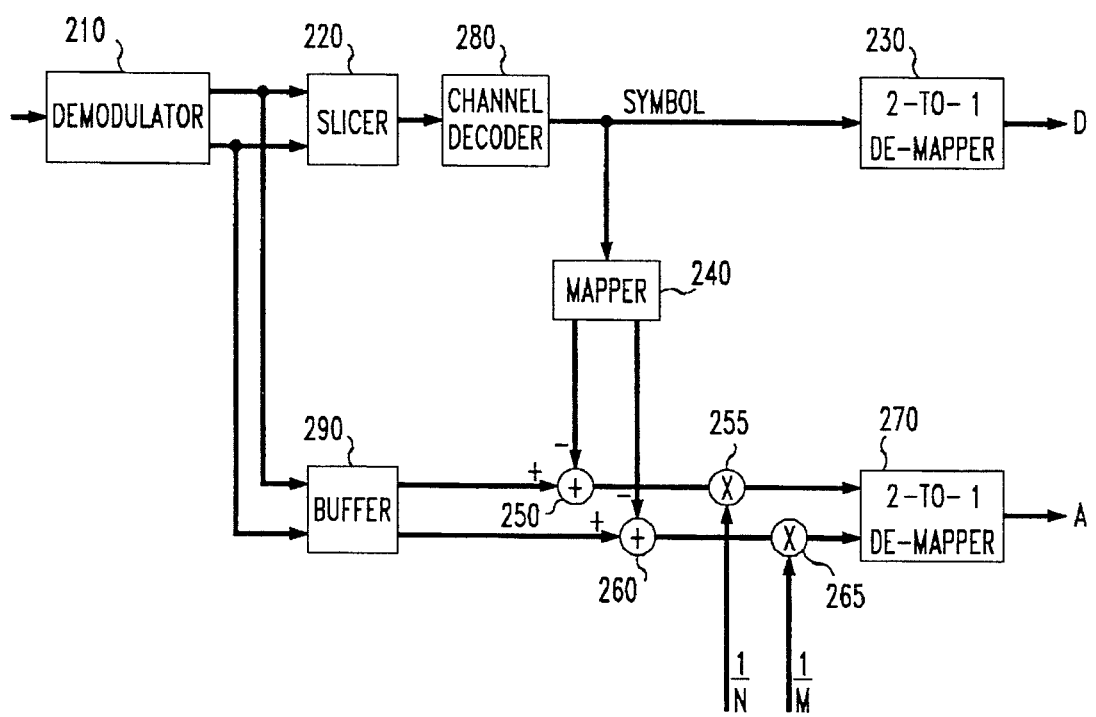
FIG. 9 shows a block diagram of a receiver, which receives the transmitted signal from the transmitter of FIG. 7.

FIG. 9 presents a basic block diagram of a receiver in conformance with the principles of this invention. This receiver is similar to the receiver of FIG. 6 except for the addition of buffer 290, and channel decoder 280. The modulated input signal received from the channel is applied to demodulator 210 which develops the in-phase and quadrature components. Those are applied to slicer 220 which calculates an "error metric" or "transition metric" for each of the data symbols from the constellation of FIG. 8. This error metric is simply the distance the received signal point is from each data symbol. Slicer 220 provides the error metric for each of the data symbols to channel decoder 280, which is illustratively a Viterbi decoder as is known in the art. Generally speaking, channel decoder 280 adds each transition metric to a stored "path metric" for each state of the trellis code and then selects a new path metric for each trellis code state. Each new path metric has the smallest sum of error metrics. In other words, channel decoder 280 estimates a received data symbol sequence before deciding on a particular data symbol in order to minimize the overall errors in the entire received symbol sequence. For example, as shown in FIG. 8, upon receiving signal point R, a hard decision would result in selecting data symbol B. However, this is a hard error since for that one received data symbol, the corresponding error metric is the smallest when compared to the error metrics for the remaining data symbols, and by itself leads to selecting the wrong data symbol. In other words, the voice signal vector v was added to symbol A in such a way that the receiver made a hard error in determining the received symbol. However, channel decoder 280 allows the receiver to recover from, or avoid, this hard error because of the underlying trellis code that was used to select each one of the data symbols for transmission. Consequently, channel decoder 280 provides the corrected data symbol, i.e., symbol A to de-mapper 230 a number of symbol intervals latter, where the number of symbol intervals is typically equal to the decoding depth.

In order to recover the voice signal, FIG. 9 includes buffer 290, which receives the outputs from modulation 210 and provides a time delay that allows for the trellis decoding to be completed first in channel decoder 280. FIG. 9 includes a 1-to-2 mapper 240 that is responsive to the symbols developed by channel decoder 280. The output of mapper 240 is the set of in-phase and quadrature components (that are applied in the FIG. 7 arrangement to elements 70 and 80). The outputs of mapper 240 are subtracted from the outputs of buffer 290 in subtracters 250 and 260. The outputs of subtracters 250 and 260 are applied, via inverse scaling elements 255 and 265, to 2-to-1 de-mapper 270 which recombines the voice samples to form the original voice signal. De-mapper 270 performs the inverse function of mapper 50.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the invention is illustrated herein as being implemented with discrete functional building blocks, e.g., element 30, etc., the functions of any one or more of those building blocks can be carried out using one or more appropriate programmed processors.

In addition, other shapes can be used, e.g., elliptical shapes, which radiate from the center of the signal space. Also, other processing can be performed on the analog signal to further alter the resultant shape of each region, e.g., differential encoding of the analog signal.

We claim:

1. A method for transmitting comprising the steps of:
   a) selecting a data symbol as a function of a data signal, where each data symbol represents a different one of a number of regions of an N-dimensional signal space, and each data symbol is associated with a different N-dimensional signal point in the N-dimensional signal space;
   b) selecting an N-dimensional signal point as a function of an applied signal, where the signal point is selected from the N-dimensional signal space;
   c) adding the signal space coordinates of the selected data symbol and the selected N-dimensional signal point to provide a resultant signal point;
   where each resultant signal point is taken from the region associated with the data symbol and where each one of the number of regions has a non-square shape.

2. The method of claim 1 wherein the shape of each one of the number of regions is a function of the characteristics of the applied signal.

3. The method of claim 2 wherein the applied signal is a voice signal and each coordinate of the signal point selected in step b) is a sample of a voice signal.

4. The method of claim 1 wherein the selecting step b) includes the step of:
   d) sampling the applied signal to provide a number of samples at most equal to the number of dimensions of the N-dimensional signal space;
   e) scaling the number of samples to provide a number of scaled samples, where the scaling step is performed in such a way that at least one of the number of samples is scaled differently from the remaining ones of the number of samples; and
   f) selecting the N-dimensional signal point as a function of the number of scaled samples.

5. A method for use in a communications system for transmitting a data signal and an applied signal, comprising the steps of:
   defining a number of N-dimensional signal spaces, where each N-dimensional signal space includes a number of regions and where at least two of the N-dimensional signal spaces have a different number of regions and a size of at least one dimension of each region is identical;
   selecting one of the number of N-dimensional signal spaces; and
   transmitting an N-dimensional signal point from the selected N-dimensional signal space, where the N-dimensional signal point is taken from one of the number of regions of the selected N-dimensional signal space as a function of the data signal and the applied first signal,
   wherein the applied signal is a voice signal and the shape of each region is proportional to the dynamic range of the voice signal.

6. The method of claim 5 wherein the number of regions in each one of the number of N-dimensional signal spaces is proportional to a data rate of the communications system.

7. A method for transmitting comprising the steps of:
   processing a first signal to provide a sequence of N-dimensional first signal points, each first signal point taken from an N-dimensional signal space, where each first signal point of the sequence defines a respective first signal vector from the origin of the signal space to the first signal point;
   processing a data signal to provide a sequence of data symbols, each data symbol associated with a different N-dimensional signal point from the signal space;
   adding each first signal vector to a respective data symbol from the sequence of data symbols to prove a sequence of resultant signal points; and
   transmitting a signal that represents the sequence of resultant signal points;
   where the magnitudes of at least one of the first signal vectors is limited in one dimension more than in another dimension.

8. The method of claim 7 wherein the first signal is a voice signal.

9. Apparatus for transmitting comprising:
   first selecting means for selecting an N-dimensional signal point as a function of a first signal where the signal point is selected from an N-dimensional signal space;

second selecting means for selecting a data symbol as a function of a data signal, where each data symbol represents one of a number of regions of the signal space, and each data symbol is associated with a different signal point in the N-dimensional signal space; and means for adding in every signaling interval, T, the signal space coordinates of the two selected signal points to provide a resultant signal point;

where each resultant signal point is taken from the region associated with the data symbol occurring in a respective signaling interval, and where each one of the number of regions has a non-square shape.

10. The apparatus of claim 9 wherein the shape of each one of the number of regions is a function of the characteristics of the first signal.

11. The apparatus of claim 10 wherein the first signal is a voice signal and each coordinate of the signal point selected by the first selecting means is a sample of the voice signal.

12. The apparatus of claim 9 wherein the first selecting means includes:

means for sampling the first signal to provide a number of samples at most equal to the number of dimensions of the N-dimensional signal space;

means for scaling the number of samples to provide a number of scaled samples, where the scaling is performed in such a way that at least one of the number of samples is scaled differently from the remaining ones of the number of samples; and third selecting means for selecting the N-dimensional signal point as a function of the number of scaled samples.

13. Apparatus for transmitting comprising:

means for processing a first signal to provide sequence of N-dimensional first signal points, each first signal point taken from an N-dimensional signal space, where each first signal point of the sequence defines a respective first signal vector from the origin of the signal space to the first signal point;

means for processing a data signal to provide a sequence of data symbols, each data symbol associated with a different N-dimensional signal point from the signal space;

means for adding each first signal vector to a respective data symbol from the sequence of data symbols to prove a sequence of resultant signal points; and means for transmitting a signal that represents the sequence of resultant signal points;

where the magnitudes of at least one of the first signal vectors is limited in one dimension more than in another dimension.

14. The apparatus of claim 13 wherein the first signal is a voice signal.

* * * * *